(12) United States Patent
Crinion

(10) Patent No.: US 6,923,615 B2
(45) Date of Patent: Aug. 2, 2005

(54) WIND DRIVEN POWER GENERATOR

(75) Inventor: Jonathan Crinion, Toronto (CA)

(73) Assignee: Jonathan Crinion Industrial Designer Ltd., Toronto (CA)

( * ) Notice: Subject to any disclaimer, the term of this patent is extended or adjusted under 35 U.S.C. 154(b) by 167 days.

(21) Appl. No.: 10/352,972

(22) Filed: Jan. 29, 2003

(65) Prior Publication Data

US 2003/0147739 A1 Aug. 7, 2003

(51) Int. Cl.⁷ ................................................ F03D 5/04
(52) U.S. Cl. ...................... 415/4.1; 415/907; 416/205; 290/44; 290/55
(58) Field of Search ..................... 415/4.1, 4.2, 4.4, 415/907; 416/205, 244 R, 246; 290/44, 55

(56) References Cited

U.S. PATENT DOCUMENTS

| | | | | |
|---|---|---|---|---|
| 4,068,131 A | * | 1/1978 | Jacobs et al. | 416/140 |
| 4,228,363 A | * | 10/1980 | Jacobs et al. | 290/44 |
| 4,590,718 A | * | 5/1986 | Angeloff | 52/116 |
| 4,878,807 A | * | 11/1989 | Baker | 416/175 |
| 6,661,113 B1 | * | 12/2003 | Bonin | 290/55 |

* cited by examiner

Primary Examiner—F. Daniel Lopez
Assistant Examiner—Igor Kershteyn

(57) ABSTRACT

A wind driven power generator is designed for mobile applications and locates the generator in a power housing at the base of the unit on an adjustable mounting arrangement. A lightweight high strength hollow column is supported in the power housing and supports a wind driven turbine at the opposite end of the column. A drive shaft within the column transfers power from the turbine to the generator and causes rotation thereof. Preferably the column provides the only support of the turbine and the column is not supported by guide wires.

11 Claims, 7 Drawing Sheets

WIND DRIVEN POWER GENERATOR

FIELD OF THE INVENTION

The present application relates to electrical power generators and in particular, to power generators for mobile applications including sailing yachts.

BACKGROUND OF THE INVENTION

Sailing yachts, on occasion, require a simple system for recharging batteries used to power various equipment on the yacht. In contrast to larger powered yachts with diesel generators, a sailing yacht may not use the engine and in many cases do not have an engine which is capable of charging the power supply.

A number of small wind driven power generators have been proposed for use in association with sailing yachts and powered yachts, however, they have not proven particularly satisfactory for high wind speeds. In a sailing yacht, the amount of available deck space which can be used for locating a wind driven power generator, is relatively small and any additional guide wires or other wide based support arrangements may interfere with the normal operation of the yacht. Furthermore, a sailing yacht that is under way is not typically horizontal and the angle of orientation is continually changing.

A further problem with both powered and sailing yachts is the mounting surface which is typically a deck, is normally slanted to accommodate drainage. The limited space on yachts and the fact that a wind driven power generator has a rotating wind, makes it necessary to keep the unit relatively small and allow mounting thereof in a position which does not unduly affect the operation of the yacht.

The present invention addresses a number of these problems and provides a wind driven power generator which in many applications is self supporting.

SUMMARY OF THE INVENTION

A wind driven power generator according to the present invention comprises a mounting base having a lower surface for attachment to a deck support surface and an upper surface for receiving a power housing at different positions to allow orientation of the housing unit, and generally, vertically. Means for securing of the housing to the mounting base is provided and serves to maintain the orientation of the power housing relative to the mounting base. A hollow, elongate column has one end thereof supported in the power housing and the column includes a drive shaft extending the length of the column and within the hollow of the column. The drive shaft is connected to an electrical power generator within the power housing and is connected to a wind driven unit mounted atop the column. The wind driven unit includes a drive connection to the drive shaft which causes rotation of the drive shaft and a corresponding rotation of the power generator located in the power housing.

According to an aspect of the invention, the wind driven power generator includes an air foil cross section of the column which further assists in orientating of the column and the wind driven unit relative to the wind direction.

In a further aspect of the invention, the column is rotatably supported in bearings provided in the power housing and the column is pivotally movable about the longitudinal axis of the column.

In yet a further aspect of the invention, the column is a carbon fiber material and has significant rigidity.

In yet a further aspect of the invention, the drive shaft located within the column accommodates limited longitudinal flexing of the shaft to accommodate movement of the column.

The wind driven power unit mounted atop the column is a horizontally mounted propeller unit located to a front side of the column and a rudder component extending to the opposite side of the column. The propeller includes a drive shaft having a beveled gear type connection with the drive shaft. Basically, the wind driven unit is lightweight and merely has a mechanical connection to transmit the rotation of the wind driven unit to the base of the unit to cause rotation of the power generator located in the base unit. With this arrangement, the wind driven unit is relatively lightweight and the weight of the actual power generation components have been moved to the power housing as opposed to being mounted atop the column. The actual electrical power typically is a current for charging a 12 volt or other battery supply is generated in the base unit. This is in contrast to many designs where the actual electrical current generating components are located atop the column. This unduly increases the weight and the forces which the column must withstand.

In the present design, a relatively long drive shaft is provided within the column to allow transmission of the forces generated by the wind driven unit to the rotational components of the generator.

In a preferred aspect of the invention, both the column and the wind driven unit rotate together with this rotational movement being accommodated by the bearings provided in the power housing.

The column is preferably at least eight feet in length and has an airfoil cross section. It positions the wind driven unit well above the deck on which the power housing is mounted and rotation of the wind driven unit is well above the height of the deck. The mounting base is typically secured at a corner of the back deck of a sailing yacht and the power housing is positioned on the mounting base such that in a normal stationary position of the yacht the power housing will be vertical.

BRIEF DESCRIPTION OF THE DRAWINGS

Preferred embodiments of the invention are shown in the drawings, wherein.

DETAILED DESCRIPTION OF THE PREFERRED EMBODIMENTS

Figure 1:
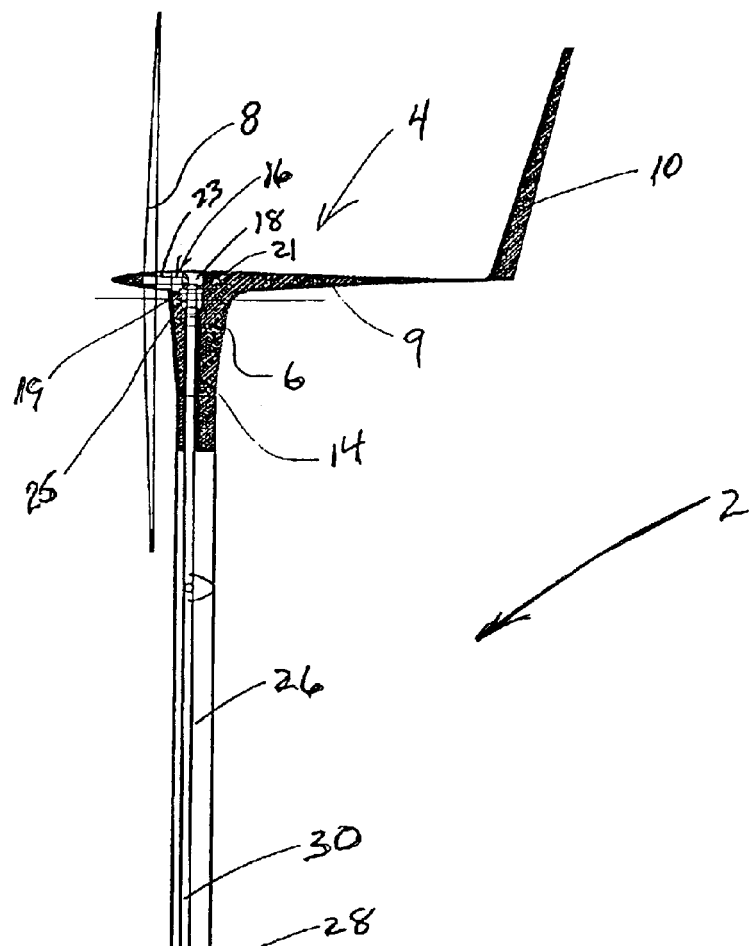
FIG. 1 is a vertical sectional view of the wind driven power generator.

The wind driven power generator 2 as shown in FIG. 1 has a lightweight wind driven unit 4 mounted atop an elongate carbon fiber column 26. The column 26 has an elongate cavity 28 which loosely receives the drive shaft 30. The column 26 is received within the power housing 40 which is secured to the mounting base 50. The mounting base 50 is secured to a deck or other mounting surface generally shown as 51 which in many applications will not be horizontal. The mounting base 50 cooperates with a reinforing plate 56 which is typically positioned below the mounting surface 51.

The mounting surface 51 could be the rear deck surface of a sailing yacht, the rear deck of a powered yacht, or other mounting surfaces. It may or may not be horizontal and in many cases, it will not be horizontal. To accommodate this, the mounting base 50 is affixed to the mount surface 51 by means of a series of bolts 60 as shown. Thus, the mounting base 50 is affixed to the mounting surface 51. The mounting base has an upper surface 54 which preferably is domed shaped to allow mounting of the power housing 40 at a host of different angles.

The power housing 40 has a lower surface 41 which is movable across the upper surface 54 of the mounting base is similar to a ball and socket joint and can be secured thereto to generally position the power housing vertically. The power housing is held in place by means of the nut and bolt arrangement 62 and the locking plate 64. Typically, the nut 65 will be accessible through various ports in the base unit to allow tightening thereof or other suitable cooperation for securement. Therefore, to properly mount the unit, the mounting base is secured to the appropriate surface and then the power housing is positioned relative to the mounting base to position it generally vertically. Once so positioned, the nut and bolt arrangement 62 is tightened and the power housing is fixed to the mounting base at the appropriate orientation.

The column may then be inserted in the upper end of the power housing 40 and this column is rotatable relative to the power housing about the vertical axis of the power housing. In this way, the column is disposed vertically and is rotatable about the vertical axis of the power housing.

The wind turbine unit 4 and the column 26 are orientated by the wind due to the air foil cross section of the column 26 as well as the tail 9 and rudder 10 of the wind driven unit. The rotating propeller 8 will is perpendicular to the wind and the rudder and tail will maintain this orientation. The propeller 8 is free to rotate relative to the housing 6 and the propeller is fixed to and rotates the drive shaft 16. This horizontal rotation of the propeller is transferred to a vertical rotation of the drive shaft 35 by the bevel gears 19 and 21. A bearing 23 is provided for the propeller 8 and a bearing 25 is provided for the upper portion of the drive shaft 30. Bearings are also provided at the base of the column to allow free rotation of the drive shaft within the column. The drive shaft 30 extends below the column member and engages in the generator 42 located in the power housing.

Bearings 70 and 72 cooperate with an extension of the column 50 and allow rotation of the column 50 about the vertical axis of the power housing.

Figure 2:
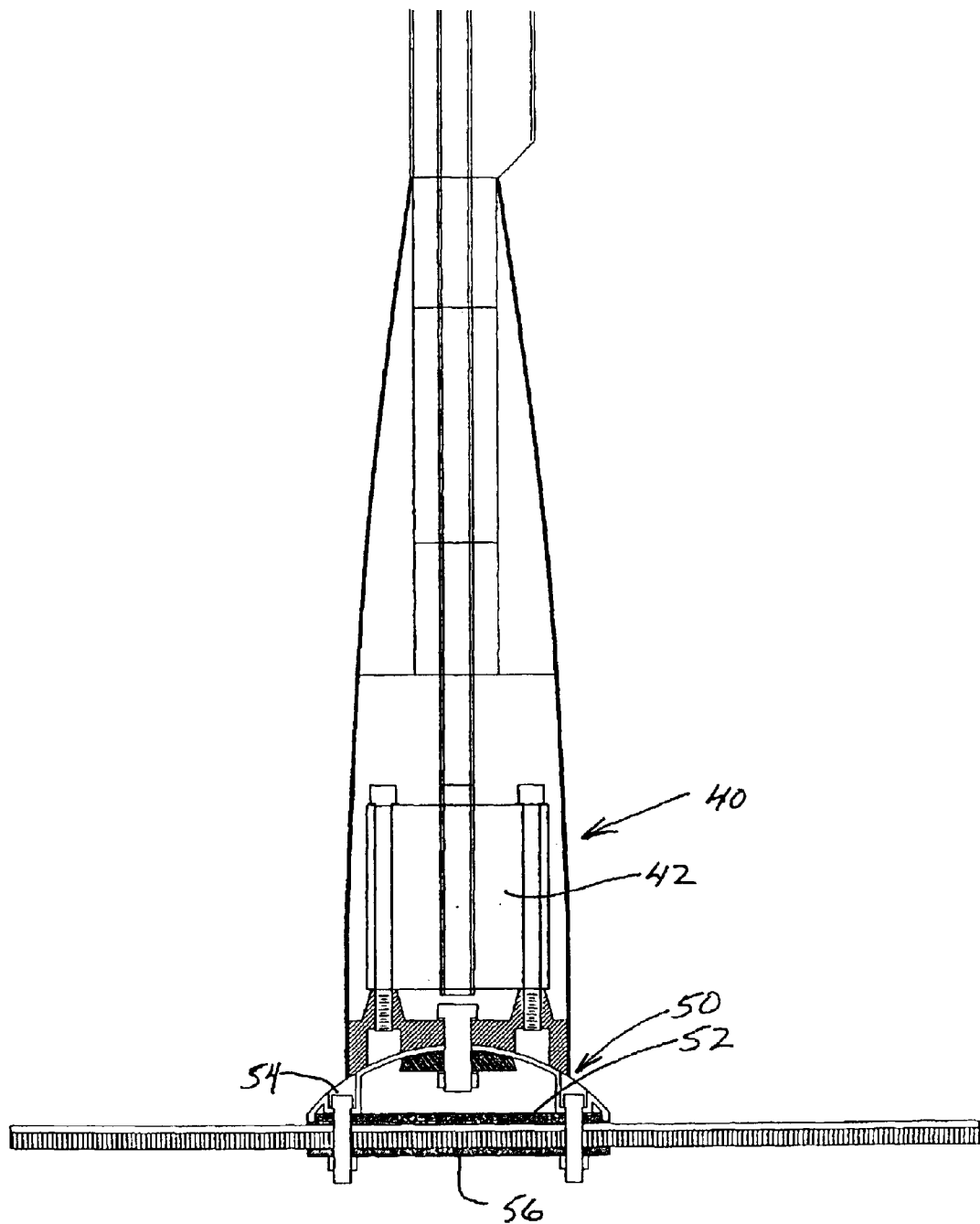
FIG. 2 shows details of the mounting base and power housing.
Figure 3:
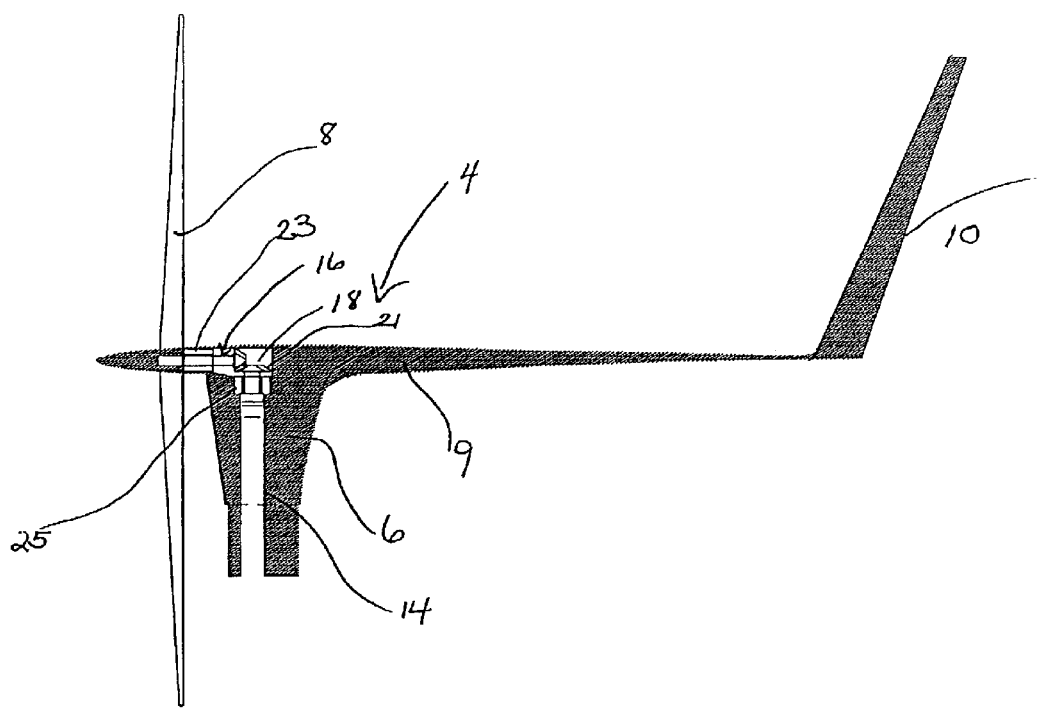
FIG. 3 shows details of the power transmission between the wind driven rotating member and the drive shaft.

Additional details of the power housing are shown in FIG. 2. Details of the wind driven propeller 8 and its association with the drive shaft 30 are shown in FIG. 3.

Figure 4:
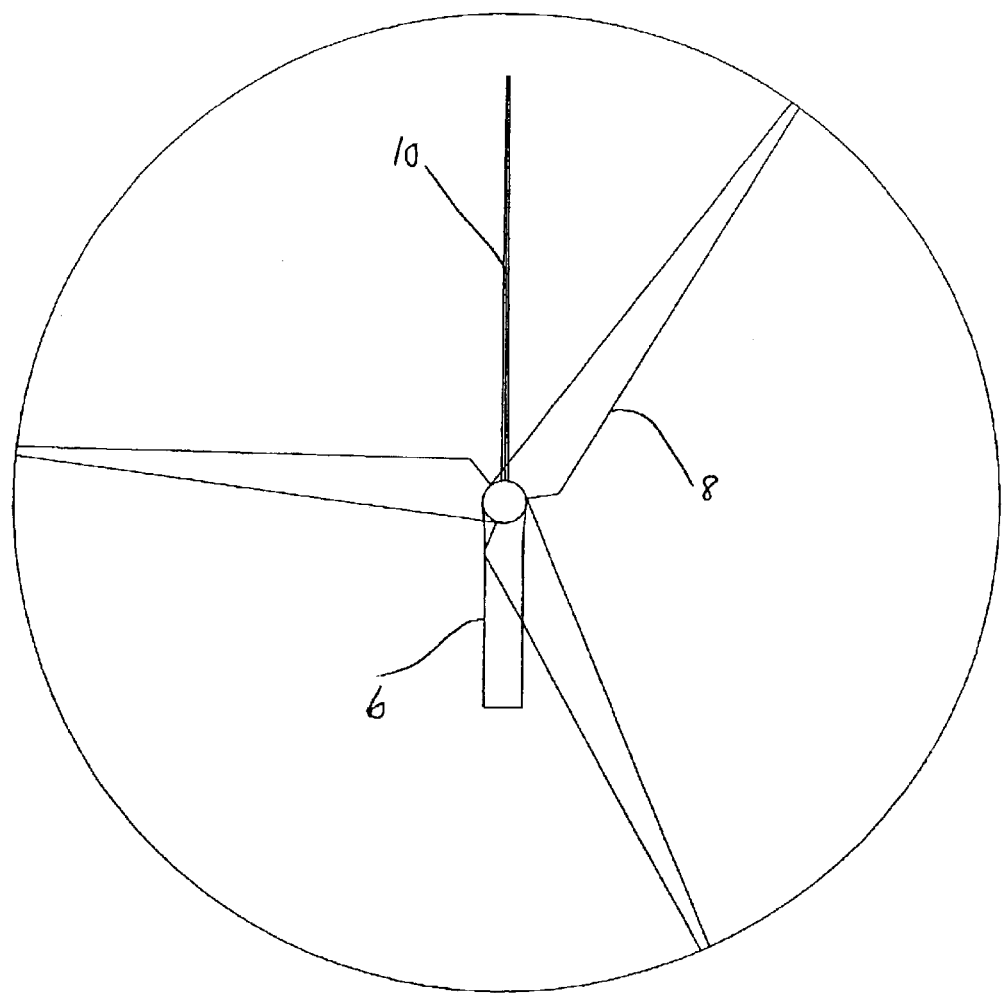
FIG. 4 is a front view of the wind driven unit.

A front view of the rotating propeller unit and the rudder 10 are shown in FIG. 4. The rudder is offset approximately seven degrees to counter the action of the spur gears.

The wind driven power generator 2 has minimized the weight of the wind turbine unit 4 and the column 30 has been designed to provide good structural rigidity. The wind generator is made of suitable lightweight materials and is appropriately reinforced. To reduce the loads the column, the column is designed to rotate with the wind driven unit 4 and has aerodynamic shape to assist in the orientation of the column and the wind drive unit relative to the wind. With this arrangement and the selection of the lightweight materials, it is possible to allow the wind driven power generator to be self supporting. It is not normally necessary to provide any guidelines or wires to ensure the orientation of the column 30 relative to the support surface. In some circumstances it may be possible to locate the power generator at a corner of the deck having a railing thereabove. This railing may provide an intermediate support for the column 30. If it is desired to provide some support at the railing, the support arrangement will be a bearing to allow rotation of the column.

Locating of the generator 42 in the power housing 40 at the base of the structure has greatly reduced the forces exerted on the column as the column is essentially a long cantilevered lever and any increase in the weight at the end of the lever is effectively magnified due to the length of the column.

In the present application, it is important to ensure that the wind driven unit 4 and the propeller 8 are positioned well above the deck surface to avoid contact with the crew or passengers.

Figure 5:
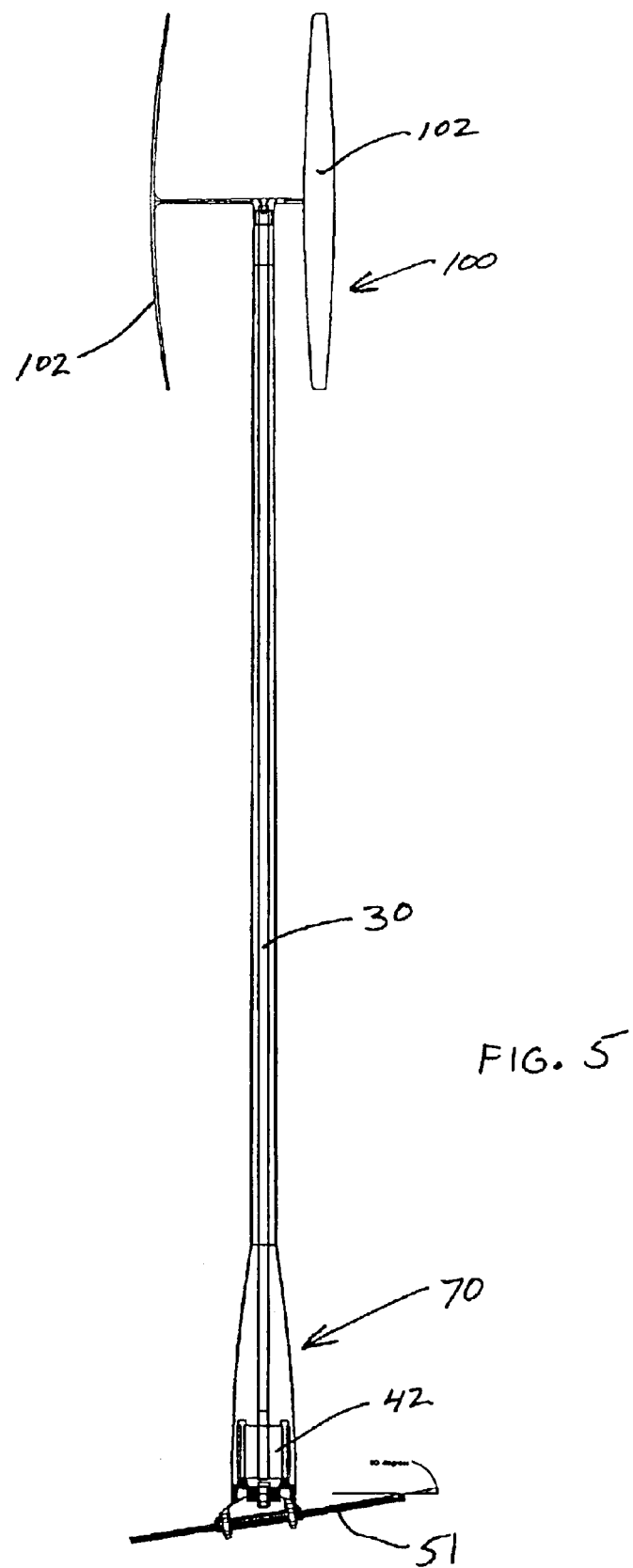
FIG. 5 is an elevational view of the power generator using a vertical axis turbine.

The alternate embodiment of FIG. 5 is a vertical axis turbine 100 having three vertical air foils 102 spaced radially outwardly the column which is directly connected to the rotating shaft 30 and drives the power generator 42. This arrangement simplifies the structure, reduces the drive train and is always aligned with the wind. With this embodiment, the column can be circular in cross section. The vertical axis turbine is made of lightweight high strength materials such as reinforced plastics. The balanced design of the rotor also helps in reducing the louds transmitted through the column to the base.

Figure 6:
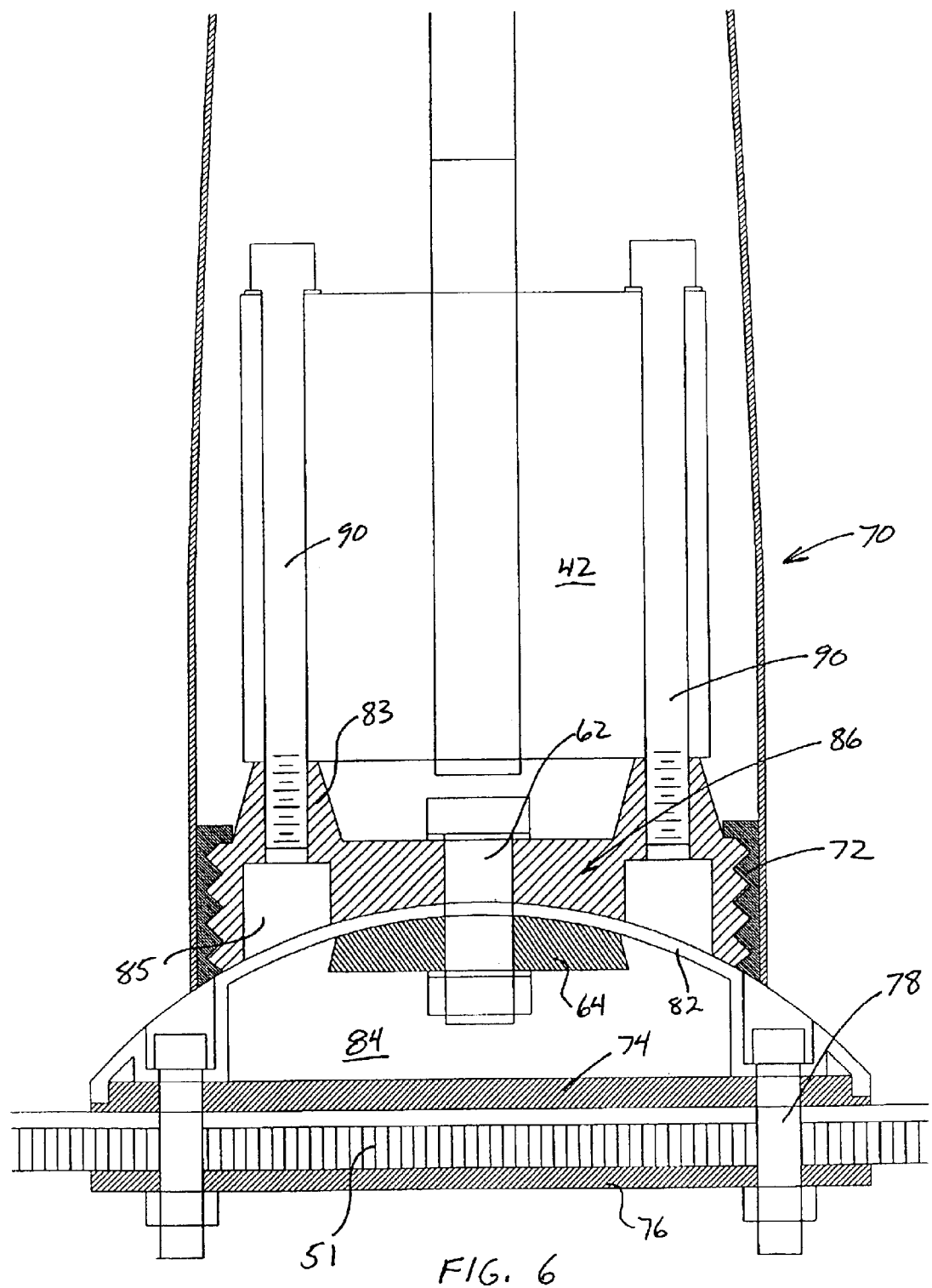
FIG. 6 is a partial sectional view showing details of the base unit of the power generator.
Figure 7:
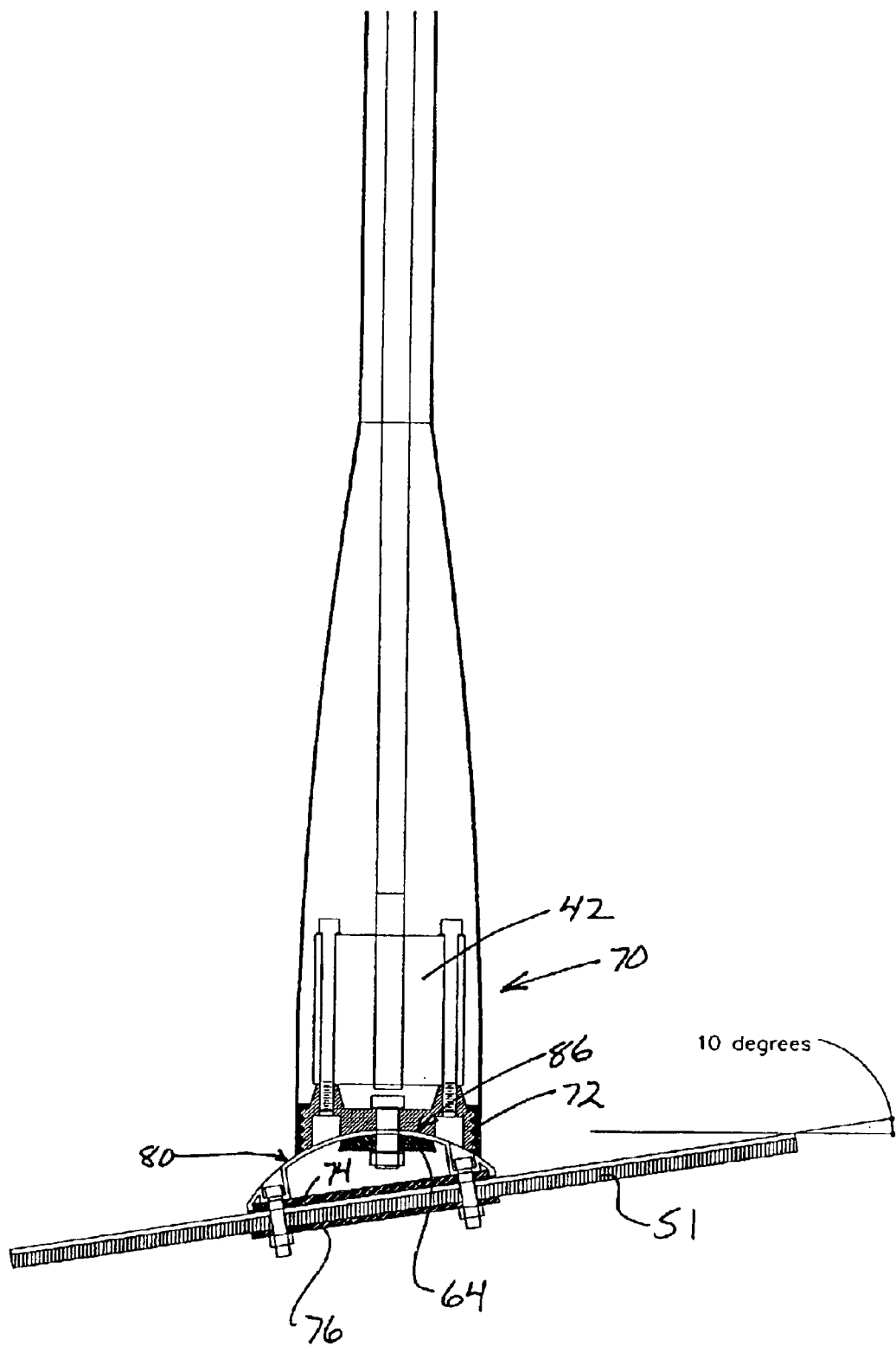
FIG. 7 shows the base unit mounted on an angled deck surface.

An alternate embodiment of the power housing is shown in FIGS. 6 and 7. The base unit 70 has an outer casing 72 with an interior thread for secure engagement with the upper mounting member 86. Member 86 has an exterior thread for cooperating with the outer casing 72 such that the casing can be screwed on to the upper mounting member 86.

To mount the base unit, the outer casing 72 is removed from the upper mounting member 86 and the generator 42 is not connected to the upper mounting member. In this way, the upper mounting member 86 is free to move over the curved surface 82 of the lower mounting member 80. These surfaces basically form a ball and socket joint such that the upper mounting member may be positioned at different angles relative to the lower. mounting member 80. The deck 51 may be at different angles as shown in FIG. 7 and upper mounting member 86 is basically leveled on the curved surface 82. The base unit is attached to the deck by bolts passing through the deck surface 51 and the reinforcing plate 76. The assembly is then tightened locking the base unit to the deck.

The next step is to level and secure the upper mounting member 86. A level may be placed across the support lugs 83 and the upper mounting member appropriately adjusted to a level horizontal position. The mounting bolt 62 can then by tightened drawing the locking plate into firm gripping engagement with the curved surface 82. The nut 65 can have locking lugs on the plate 64 to avoid rotation of the nut. In this way, tightening of bolt 62 from above will allow locking of the upper mounting member in the desired position.

After the upper mounting member has been appropriately leveled and locked on the base, an electrical power generator 42 can be attached to the plate by means of the mounting bolts 90. These bolts can screw into the support lugs 83 or can have a nut attachment within the cavities 85 of the mounting member 86. After the generator has been attached to the upper mounting member, the outer casing 72 can be screwed on to the upper mounting 86. It is then possible to insert the drive shaft into the power generator 82 through the outer casing 72.

FIG. 7 shows the mounting of the base unit 70 on an angled deck surface 51. It is very common in yachting applications to mount the unit on an angled surface as the surfaces are designed for drainage.

The system of the present invention has located the heavier components of the system in the base unit and reduced the size and weight of the components which extend well above the deck surface. In many yachting applications, it is extremely important to maintain a low center of gravity and the prior art designs have not recognized the benefits of reducing the overall weight of the entire system as well as locating the heavier components in the base of the unit. All of the components above the base unit are designed to minimize weight and the use of high strength carbon fiber material, particularly for the column and the components atop the column, are desired and have proven satisfactory.

The system is easy to mount at a convenient location and is designed to reduce any undesirable effects caused by increasing the center of gravity of the yacht. For many racing applications, both the size of the rotating members and the size of the power generator 42 are minimized to match the anticipated requirements of the yacht. A racing yacht is typically operated at higher speeds, perhaps 15 to 30 knots and the power requirement is much lower than that for a pleasure craft. The present system has particular application for marrying the power requirements of a racing yacht to a speed of at least 15 knots to reduce the size and weight of the system and reduce the size and weight of the power generator 42. Recognizing the lower power requirements of a racing yacht and the higher wind speeds common with racing yachts has allowed the size and weight of the components to be reduced.

Although various preferred embodiments of the present invention have been described herein in detail, it will be appreciated by those skilled in the art, that variations may be made thereto without departing from the spirit of the invention or the scope of the appended claims.

What is claimed is:

1. A wind driven power generator comprising a mounting base having a bottom surface for attachment
    to a deck surface and an upper curved surface for cooperating with a lower mounting surface of a power housing
    to allow orientation of said power housing; vertically above said mounting base;
        means for securing said housing to said mounting base and maintaining the orientation of said power housing;
        a hollow elongate column with one end supported by said power housing;
        a drive shaft extending the length of said column and within the hollow of said column and connected to a power
    generator located in said power housing; and a wind turbine unit mounted atop said column and connected to said drive shaft to cause rotation thereof as said wind turbine unit rotates.

2. A wind driven power generator as claimed in claim 1 wherein said wind turbine unit is a vertical axis wind turbine having a vertical axis aligned with said column.

3. A wind driven power generator as claimed in claim 2 wherein said vertical axis wind turbine has three vertical air foils.

4. A wind driven power generator as claimed in claim 2 wherein said mounting base and said lower surface of said power housing cooperate to form a ball and socket connection.

5. A wind driven power generator as claimed in claim 4 wherein said means for securing is a bolt and nut arrangement wehre said bolt is accessible within said power housing.

6. A wind driven power generator as claimed in claim 1 wherein said hollow elongate column is made of a reinforced plastic.

7. A wind driven power generator comprising; a mounting base having a bottom surface for attachment
    to a deck surface and an upper curved surface for receiving a power housing at different positions to allow orientation of said
    power housing vertically above said mounting base; moans for securing said power housing to said mounting
    base and maintaining the orientation of said power housing; a hollow elongate column with one end supported by said
    power housing; a drive shaft extending the length of said column and within the hollow of said column and connected to a power generator located in said power housing; a wind turbine unit mounted atop said column and
    connected to said drive shaft to cause rotation thereof as said
    wind turbine unit rotates; and wherein said column is of an air foil cross section and is supported by bearing in said power housing to allow pivotal movement about a longitudinal axis of said column.

8. A wind driven power generator as claimed in claim 7 wherein said column and said wind driven unit rotate together about said longitudinal axis.

9. A wind driven power generator comprising:
    a mounting base having a bottom surface for attachment to a deck surface and an upper curved surface for receiving a power housing at different positions to allow orientation of said power housing vertically above said mounting base;
    means for securing said power housing to said mounting base and maintaining the orientation of said power housing;
    a hollow elongate column with one end supported by said power housing;
    a drive shaft extending the length of said column and within the hollow of said column and connected to a power generator located in said power housing;
    a wind turbine unit mounted atop said column and connected to said drive shaft to cause rotation thereof as said driven turbine unit rotates; and wherein said column is of a carbon fiber material.

10. A wind driven power generator as claimed in claim 9 wherein said wind driven unit is a horizontal axis turbine having a propeller drive member.

11. A wind driven power generator as claimed in claim 10 wherein said propeller drive member drives a bevel gear which drives a further bevel gear secured on said drive shaft.

* * * * *